May 26, 1931. J. H. FOX ET AL 1,806,846

PROCESS AND APPARATUS FOR MAKING COMPOSITE GLASS

Filed Oct. 6 1928

INVENTORS
John H. Fox
and
Harry F. Hitner
by
James C. Bradley
atty.

Patented May 26, 1931

1,806,846

UNITED STATES PATENT OFFICE

JOHN H. FOX, OF PITTSBURGH, AND HARRY F. HITNER, OF OAKMONT, PENNSYLVANIA, ASSIGNORS TO PITTSBURGH PLATE GLASS COMPANY, A CORPORATION OF PENNSYLVANIA

PROCESS AND APPARATUS FOR MAKING COMPOSITE GLASS

Application filed October 6, 1928. Serial No. 310,808.

The invention relates to a process and apparatus for making what is known as composite or non-shatter glass. Such glass ordinarily comprises two sheets of glass with an interposed sheet of pyroxylin plastic, such as pyralin or celluloid, although in some cases the composite sheet is made up of three sheets of glass and two sheets of plastic. The glass and pyralin are ordinarily cemented together by the use of gelatin, which is placed in thin films on the inner faces of the glass sheets and allowed to dry preliminary to the cementing operation. The sheets are then placed in assembled relation and heat and pressure applied to soften the cement and secure adhesion, the composite plate thus formed being allowed to cool down under pressure. The pressure applied may range from 100 to 150 pounds per square inch, and the temperature required is in the neighborhood of 250 degrees F. The present invention relates to an improved process and apparatus for securing the necessary temperature conditions during the application of pressure, and the provision of a process and apparatus for accomplishing the compositing function in a minimum of time and at a low cost.

Generally speaking, the desired result is secured by placing the sheets with their coatings of cement between the opposing platens of a press, and during the pressing operation, heating the sheets by the use of high frequency electric current applied to the platens or terminals. The high frequency current as thus applied induces a molecular vibration in the interposed sheets and quickly heats them to the desired temperature. The frequency preferably used is upwards of $10^5$ cycles per second, which permits the use of relatively low voltage, 1000 volts or less. The composite sheet is allowed to cool under pressure as in the ordinary compositing process.

By the use of this process, the glass and cellulose plastic may be heated very rapidly, and if desired, the plastic may be heated more rapidly than the glass, which action may be accentuated by cooling the platens in contact with the glass by suitable means, such as a circulation of water through the platens. A circulation of water through the platens may also be employed after the heating operation in order to speed up the cooling of the sheet while the pressure is maintained and thus increase the capacity of the press.

Figure 1:
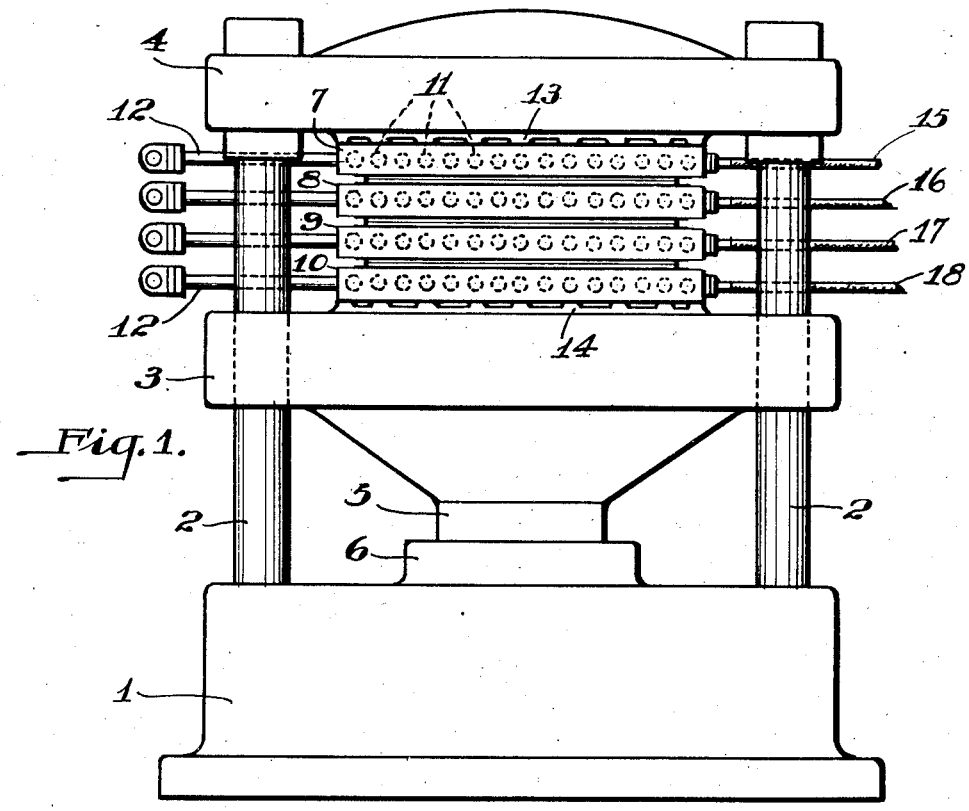
Figure 2:
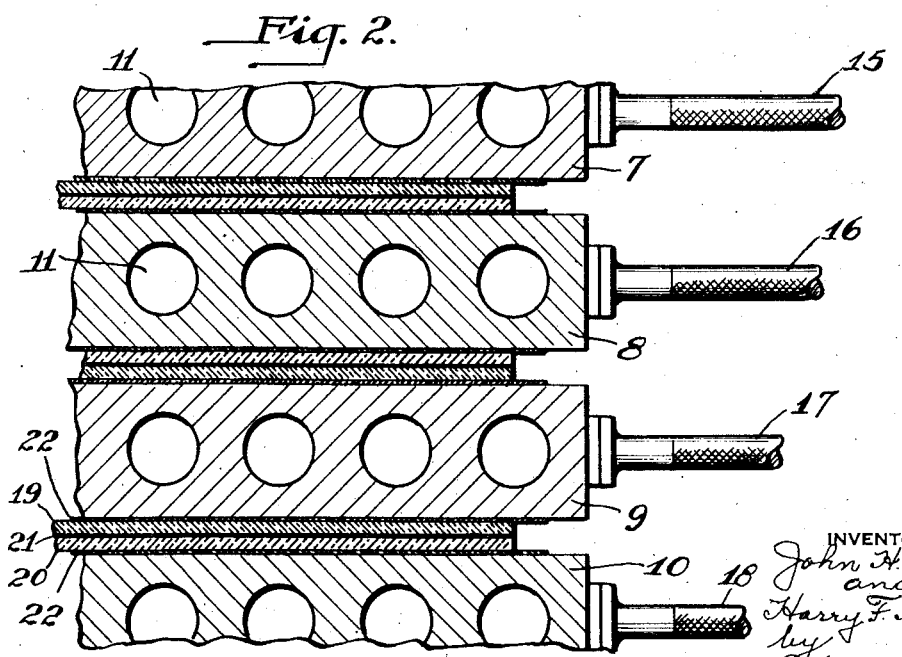

One embodiment of the invention is shown in the accompanying drawings, wherein:

Figure 1 is a side elevation. And Fig. 2 is an enlarged fragmentary section.

Referring to the drawings, 1 is the base of the press carrying four guide rods 2 which extend through the vertically movable table 3 and the top plate 4 at their upper ends. The table is carried by a plunger 5 moved up by hydraulic pressure applied in the cylinder 6.

Four platens 7, 8, 9 and 10 are provided between the table and top plate so the three composite plates may be pressed at one time, but it will be understood that this number may be increased or reduced as desired. Each platen is cored out to provide the passages 11 through which a cooling medium, such as water, may be circulated from the pipes 12 after the heating operation, as later described. The details incident to the circulation system are not shown as apparatus of this kind is well known in the art.

The top and bottom platens are insulated from the top plate 4 and table 3 by the plates 13 and 14 of any suitable insulating material. Connected to the platens are the four leads or terminals 15, 16, 17 and 18. Between each pair of opposing platens are the sheets to be formed into the composite plates, each set consisting of a pair of glass sheets 19 and 20 with an interposed sheet 21 of pyroxylin plastic, the inner face of each sheet of glass being provided with a coating or film of cement such as gelatin.

After the sheets are positioned between the platens, as shown, pressure is applied by the plunger 5 to place the sheets under a pressure of approximately 150 pounds per square inch. At the same time, high frequency current is applied to the terminals 15, 16, 17 and 18, the frequency being $10^5$ cycles or more with a voltage somewhat less than 1000. The equipment for securing the high frequency includes preferably the oscillator tubes, well-known in the art, by the use of which any desired range of frequency may be secured. The high frequency current induces a molecular vibration in the glass and celluloid and quickly heats them to the desired temperature, preferably about 250 degrees F. The current is then discontinued and the sheets are allowed to cool under pressure until they reach a temperature at which they can be handled, at which time the table is moved down, the composited plates removed, and new sets of sheets are positioned preliminary to a second pressing operation. The cooling under pressure is promoted by circulating water through the passages 11. The operation may be further speeded up by circulating water through the passages even during the heating operation. Under these conditions, the outer layers of glass in the sheets 19 and 20 will remain comparatively cool, while the plastic sheet 21 and the cement are heated to the desired temperature for compositing. The cooling of the entire composited plate under pressure may then be accomplished more rapidly than is possible if no cooling fluid is applied until the concluding of the heating operation. We have found that the pyroxylin plastic heats more rapidly in all cases than the sheets of glass, which is a favorable factor, as it is pyroxylin plastic and cement which require the heat rather than the glass. Blotting paper 22 is preferably used to cushion the glass sheets and prevent breakage, as is well known in the art. If desired, several sets of sheets to be composited may be placed between each pair of platens, although it is preferred to have only a single set between each pair of platens as shown.

The operation may be carried on rapidly, due to the quick heating and cooling and breakage is reduced to a minimum due to the fact that the glass sheets do not have to be heated to the same high temperature as the pyroxylin plastic as has heretofore been the case. The reduced range of heating required lessens the danger of cracking the glass under the severe pressure conditions involved. This method of heating also reduces the tendency of the platens to work and so impose strain on the glass. This tendency to warp is considerable where the platens are first heated to a high temperature by steam and then cooled by water, as has heretofore been the practice. The present method which involves no requirement for heating the platens reduces the temperature changes in the platens to relatively narrow limits so that there is no tendency to distort or warp the platens.

What we claim is:

1. A process of applying heat and pressure to a plurality of sheets of glass and reinforcing material which consists in placing the sheets in stacked relation between pressure members, causing such members to approach and apply compressive force to the set of sheets, and supplying high frequency electric current to said members so as to induce molecular vibration in said sheets and heat them to the desired temperature.

2. A process of applying heat and pressure to a plurality of sheets of glass and reinforcing material which consists in placing the sheets in stacked relation between pressure members, causing such members to approach and apply compressive force to the set of sheets, and supplying high frequency electric current to said members so as to induce molecular vibration in said sheets and heat them to the desired temperature, the reinforcing material being treated to a higher degree than the glass sheets.

3. A process of applying heat and pressure to a plurality of sheets of glass and reinforcing material which consists in placing the sheets in stacked relation between pressure members, causing such members to approach and apply compressive force to the set of sheets, supplying high frequency current to said members so as to induce heat in said sheets, and applying a cooling medium to said members.

4. A process of applying heat and pressure to a plurality of sheets of glass and reinforcing material which consists in placing the sheets in stacked relation between pressure members, causing such members to approach and apply compressive force to the set of sheets, supplying high frequency current to said members so as to induce heat in said sheets, and applying a cooling medium to said members after the sheets have been heated and the application of current is discontinued.

5. A process of applying heat and pressure to a plurality of sheets of glass and reinforcing material which consists in placing the sheets in stacked relation between pressure members, causing such members to approach and apply compressive force to the set of sheets, supplying high frequency current to said members so as to induce heat in said sheets, and applying a cooling medium to said members, during the application of current and also after the application of such current is discontinued.

6. Apparatus for applying heat and pressure to a plurality of sheets of glass and reinforcing material to produce a composite plate comprising a pair of opposing platens, means for applying power to move one of the platens toward the other, and means for supplying high frequency electric current to said platens.

7. Apparatus for applying heat and pressure to a plurality of sheets of glass and reinforcing material to produce a composite plate comprising a pair of opposing platens, having passages therethrough, means for applying power to move one of said platens toward the other, means for supplying high frequency electric current to said platens, and means for directing a cooling flow of fluid through said passages.

In testimony whereof, we have hereunto subscribed our names.

JOHN H. FOX.
HARRY F. HITNER.